April 11, 1961
M. O. HEAPY
2,978,768
CORD CLAMP
Filed Jan. 19, 1959
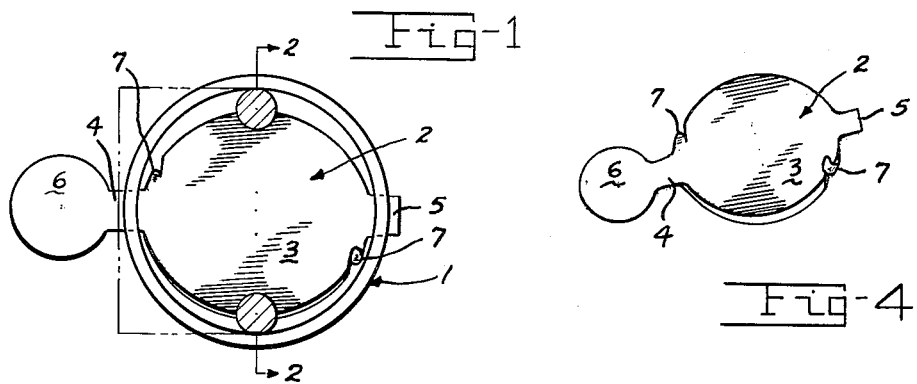
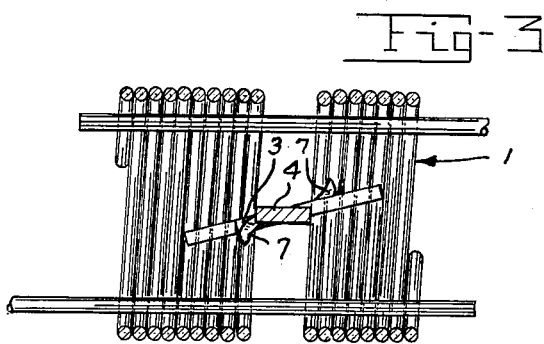
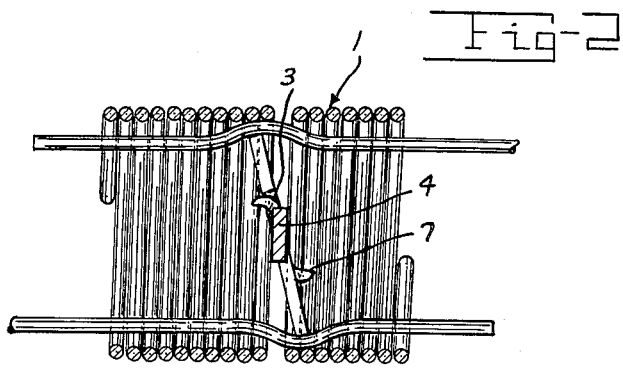
INVENTOR.
MARVIN O. HEAPY
BY
*Jerome P. Bloom*
ATTORNEY

United States Patent Office 2,978,768
Patented Apr. 11, 1961

2,978,768

CORD CLAMP

Marvin O. Heapy, 445 Fairgreen Drive, Dayton, Ohio

Filed Jan. 19, 1959, Ser. No. 787,557

12 Claims. (Cl. 24—134)

This invention relates to a simple device for connecting free extremities of cords, cables, and the like and establishing a required tension thereon. It provides what may be aptly termed a "mechanical knot."

The connector art is an old one. Many devices have been previously proposed for anchoring or tying shoe laces, rope, cables and similar items. Most of these devices, however, have structural or functional characteristics which cause them to be limited in application. Many are complex and costly to fabricate.

The present invention was particularly developed to provide a device for connecting and tensioning the free ends of cables, laces or cords which would be more versatile in character, simpler to fabricate and, accordingly, more economical to use.

The invention is described herein with particular reference to an embodiment applicable to tying shoe laces. However, while a single application and embodiment of the invention is illustrated, it will nevertheless be readily apparent to those versed in the art that the application and embodiment of the invention is not so limited, nor is such intended. In its simplest form the invention employs a resilient spring housing of a tubular character open to either end which has a flapper element inserted to be biased thereby to normally prevent passage of a cord through the housing. The flapper element is operable to permit the passage of the free ends of a cord thereby in opposite directions and capable of automatically functioning to lock the free ends of the cord to the housing and positively prevent their withdrawal. The tension established on the cord in the process will be positively maintained. The tension may be increased but cannot be decreased without positive release of the flapper.

A primary object of the invention is to provide improvements in devices for connecting and tensioning cord or cable type elements rendering them simpler to fabricate, more efficient and satisfactory in use, more versatile in application and highly economical in character.

A further object of the invention is to provide a highly simplified device for binding laces, cords, cables, and the like, in a tensioned condition.

An additional object of the invention is to provide a simple connector device particularly adaptable to provide a mechanical knot or tie for shoe laces.

Another object of the invention is to provide means affording and improved cable clamp adapted to accommodate an increase in cable tension without danger or release of the clamp.

An additional object of the invention is to provide a device of the character described possessing the advantageous structural features, the inherent meritorious characteristics and the means and mode of operation herein described.

With these primary and other objects in view, as will more fully appear in the specification, the invention intended to be protected by Letters Patent consists of the features of construction, the parts and combinations thereof, and the mode of operation as hereinafter described or illustrated in the accompanying drawings, or their equivalent.

Referring to the drawings wherein is illustrated a particular embodiment and application of the invention but not necessarily the only form of embodiment or application of the invention, Fig. 1 is an end view of a device in accordance with the invention;

Fig. 2 is a cross-sectional view of the device of Fig. 1 taken on line 2—2 thereof, illustrating the device in a binding or clamping relation to the free ends of a shoe lace;

Fig. 3 is a view similar to that of Fig. 2 but illustrating the device in a condition wherein the flapper control member is so disposed to permit the free insertion or withdrawal of the ends of the shoe lace; and Fig. 4 is a perspective view of the flapper control member employed.

The invention can be best described with reference to the embodiment of the drawings. The device shown is particularly applicable to mechanically tie a shoe lace and positively maintain a predetermined tension thereon. It consists of two elements, a coil spring 1 and a particularly formed plate-like flapper control element 2. As shown, the flapper 2 includes a circular disc portion 3 which has a diameter slightly less than the internal diameter of the coil spring 1. Integrally connected to the disc 3 are a pair of plate-like diametrically projected generally rectangular ears 4 and 5 which are similarly twisted relative the disc to commonly define a plane at an acute angle to the plane of the disc. Integrally connected to the outer end of the one ear 4 is a flat disc shaped lever or handle 6 which is used to manually operate the flapper element 2 as assembled. The disc handle 6 lies in the plane common to the ears 4 and 5. Peripheral segments 7 are struck from the disc 3 at diametrically opposed positions respectively adjacent and to opposite sides of the ears 4 and 5. The segments 7 are bent to project oppositely from the disc.

The inventive unit is assembled by spreading adjacent coils of the spring intermediate its extremities and inserting the flapper element 2 diametrically to dispose its disc portion 3 within and in substantially bridging relation to the spring. The ears 4 and 5 respectively project diametrically between the adjacent coils of spring 1 and outwardly thereof to be normally held thereby, when the spring has been released as seen in Fig. 2 of the drawings, in a plane generally at right angles to and transversely of the spring 1. In this position of the flapper element the flat faces of the ears 4 and 5 are in abutting relation to the adjacent spring coils. The handle 6 projects externally of the coil springs as may be seen from Fig. 1 of the drawings. The deflected portions 7 of the disc 3 prevent the flapper element 2 from being inadvertently withdrawn from the spring 1 in a manner believed obvious.

It will be seen from Fig. 2 of the drawings that the bias of the spring 1 normally maintains the vertical relation of the ears 4 and 5 which serve as pivots. The disc portion 3 of the flapper, due to the relative twist of the ears 4 and 5, is at a slight angle to this vertical to cause a slight spacing between the disc and the inner wall of the coil spring 1 to either side of the ears. It should be noticed that the spacing between the disc 3 and the surface of the coil spring 1 as thus provided shall be less than the thickness of the lace, cord or cable elements to which the inventive unit is to be applied.

To apply the device for knotting or tightly tying the free ends of a shoe lace, the handle portion 6 of the flapper 2 is grasped between the fingers of one hand while the coil spring 1 is held in the fingers of the other hand. The flapper 2 is then rotated 90° in a counter-clockwise direction to a position as shown in Fig. 3 of the drawings to substantially increase the space between the disc 3 and the inner wall of the coil spring 1 to either side of the ears 4 and 5. The 90° pivot of the ears 4 and 5 causes their rectangular edges to spread the adjacent coils of the spring and be wedged therebetween, establishing the relatively open position of the flapper shown in Fig. 3. It is exceedingly important that the edges of the ears 4 and 5 be rectangular to insure that this will obtain. In the example shown the free ends of the shoe lace are oppositely inserted between the disc portion 3 of the flapper 2 and the inner surface of the coil spring 1 respectively to either side of the ears 4 and 5. A slight twist of the handle 6 to turn the edges of the ears 4 and 5 from their wedged relation to the adjacent coils of the spring results in the spring 1 immediately pivoting the ears 4 and 5 back to a vertical position where their flat sides are contained in abutting relation to the adjacent coils of the spring. As the flapper is thus quickly snapped to the position shown in Fig. 2 of the drawings, the ends of the cord or shoe lace are positively clamped by the disc portion 3 to the inner surface of the coil spring 1. To increase the tension on the shoe lace it is merely necessary to pull the respective free ends of the lace further inwardly relative the coil spring 1. A bias is thereby transmitted from the lace through disc 3, the ears 4 and 5 to spread and energize the containing coils of the spring 1. On release of the ends of the shoe lace when sufficient tension is established, the spring having been energized will bias the ears 4 and 5 to cause the disc portion 3 to once more lock the ends of the lace in their so tensioned position. It may be thus seen that the coil spring 1 which serves as the housing for the flapper element 2 maintains a bias thereon to constantly urge it to its locking or clamping position except when the flapper is positively pivoted 90° to its open position.

The flapper 2 as utilized in the illustrative embodiment of the invention is formed of a single plate having uniform thickness. The ear and handle portions are merely slightly twisted to establish them in a common plane at an acute angle to the central disc portion 3.

It may be readily seen the example shown can be applied equally in structure and concept to cables, cords, laces or similar elements. The device is extremely simple in character and highly economical to fabricate. A basic concept of the invention in the form described is to utilize the inherent resiliency of the housing element to control the clamping element so that irrespective of the nature of the cord or cable elements their introduction and locking may be simply and positively effected. Any tendency or pull on a cord to withdraw it from the resilient housing will only cause a firmer lock of the cord therein.

While a particular illustrative embodiment of the invention has been shown in a particular application, it should now be obvious to those versed in the art that the concepts embodied can be just as novelly utilized in other forms and for other applications. Such is to be construed as within the limits of the invention defined by the appended claims.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. A cord clamp device, including a generally tubular element adapted to threadedly receive the free end of a cable, a second element within said tubular element and having integral projections resiliently engaged in the wall of said tubular element to be biased thereby to clamp the cable to said first element under a predetermined tension, said elements being so connected to accommodate a drawing of the cable through said tubular element to increase the tension thereon and normally operative to automatically maintain such increased tension.

2. A clamp apparatus, including a coil spring providing a cylindrical housing, a disc within said spring having diametral projections lodged between adjacent coils of said spring, said disc being biased thereby to substantially bridge said spring and close the passage therethrough, one of said disc projections providing means for pivoting said disc against the bias of the spring to permit the free ends of cords or the like to be passed through the spring to either side of said projections, the said adjacent coils being operative to bias said disc to pivot to its bridging relation to the spring to clamp the cords to the inner wall of the spring.

3. A clamp apparatus, including a coil spring providing a cylindrical housing, a disc within said spring having diametral projections lodged between adjacent coils of said spring, said disc being biased thereby to substantially bridge said spring and close the passage therethrough, one of said disc projections providing means for pivoting said disc against the bias of the spring to permit the free ends of cords or the like to be passed through the spring to either side of said projections, the said adjacent coils being operative to bias said disc to pivot to its bridging relation to the spring to clamp the cords to the inner wall of the spring, said disc being angularly inclined to the plane of said projections to thereby accommodate an increase of tension on the cords while maintaining a lock thereof to said spring.

4. A cord clamp device, including a pair of clamp elements pivotally connected, means providing the pivotal connection between said elements including a pair of plate-like pivots and biasing means containing said pivots operative to selectively hold them in either of two positions substantially at right angles to each other, one of said positions providing a space between said clamp elements for free passage of the free ends of cords or the like therebetween, and the other of said positions closing the space between said clamp elements to clamp the cords therebetween and provide means preventing withdrawal of the cords while providing for advance of the cords between said clamp elements and automatic locking thereof in advance positions.

5. A cord clamp device, including a resilient housing having a passage therethrough, a plate inserted transversely of the passage in said housing to have projected portions extend through the wall of said housing to provide biased pivot means for said plate, the housing maintaining a bias on said pivot means to normally dispose said plate in relative clamping relation to the inner surface thereof, means for pivoting said plate against the bias of said housing to provide for introduction of the free ends of a cord through said housing to either side of said plate, whereby on release of said pivot means said housing will automatically bias said plate to cause said plate to return to its clamping relation to the inner surface thereof to clamp the free ends of the cord element therein and fully resist their withdrawal.

6. A tie device, including a resilient housing having opposed apertures therein, bridging means normally disposed transversely of said housing to substantially bridge the interior thereof between said apertures, means interconnected between said transversely disposed means and said housing, said housing biasing said transversely disposed means to its bridging position and accommodating pivoting thereof for free passage of cord and the like through the apertures in said housing from opposite directions, said housing being operative to clamp said bridging means in locking relation to the cord passed through said housing apertures so as to prevent withdrawal thereof from said housing.

7. A clamp device, including a resilient sleeve, means within said sleeve normally disposed to substantially bridge said sleeve and having portions integrally connected thereto projected through said sleeve to be biased by said sleeve to urge said bridging means to maintain its normal bridging position.

8. A tie device, including a resilient tubular element, an insert slip fit within said element transversely thereof biased to block passage therethrough, means on said insert preventing its inadvertent withdrawal from said element, control means integral with said insert projecting from said element for displacing said insert in said element to provide for passage of cable elements thereby, said insert being operative on release of said control means to lock the cable elements to said tubular element and prevent withdrawal thereof.

9. A clamp apparatus, including a coil spring providing a cylindrical housing, a disc within said spring having diametral projections lodged between adjacent coils of said spring, means on said disc to prevent its inadvertent withdrawal from said spring, said disc being biased thereby to substantially bridge said spring and close the passage therethrough, one of said disc projections providing means for pivoting said disc against the bias of the spring to permit the free ends of cords or the like to be passed through the spring to either side of said projections, the said adjacent coils being operative to bias said disc to pivot to its bridging relation to the spring to clamp the cords to the inner wall of the spring.

10. A cord clamp device including a tubular housing of resilient material, means within said housing having relatively flat pivot portions projected through opposite side portions of the housing and biased thereby to substantially bridge said housing whereby to provide for passage of a cord or the like thereby in one direction and lock the cord against withdrawal in the opposite direction.

11. In apparatus defining a cord clamp, a first resilient clamp element defining a channel including arcuately formed coil-like sections intermediate its extremities capable of being flexed to provide a general axial spacing thereof, a second clamp element in bridging relation to the channel having relatively flattened pivot portions slip fit between adjacent coil-like sections at generally diametrically opposite positions and biased thereby to close the channel, the configuration of said second clamp element being such to provide free passage for a cord or the like thereby within the channel in one direction and to lock the cord against withdrawal in the opposite direction.

12. A cord clamp device comprising a clamp element having a passage therethrough, a flapper element within the passage in said clamp element disposed transversely thereof and having pivot portions resiliently engaged to said clamp element to normally be biased thereby to substantially close said passage and to a position to clamp the free end of a cord or the like in the passage in said clamp element in a manner to prevent its withdrawal in one direction while accommodating a drawing of the cord in the opposite direction to automatically establish an increased tension thereon.

References Cited in the file of this patent

UNITED STATES PATENTS

| | | |
|---|---|---|
| 250,848 | Smith | Dec. 13, 1881 |
| 455,512 | Luke | July 7, 1891 |
| 1,064,013 | Sackett | June 10, 1913 |
| 1,272,392 | Craven et al. | July 16, 1918 |
| 2,556,491 | Delorenzo | June 12, 1951 |